(12) United States Patent
Xu et al.

(10) Patent No.: US 8,776,005 B1
(45) Date of Patent: Jul. 8, 2014

(54) MODELING MECHANICAL BEHAVIOR WITH LAYOUT-DEPENDENT MATERIAL PROPERTIES

(71) Applicant: Synopsys, Inc., Mountain View, CA (US)

(72) Inventors: Xiaopeng Xu, Cupertino, CA (US); Dasarapu Vinay Kumar, Hyderabad (IN); Xi-Wei Lin, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/745,732

(22) Filed: Jan. 18, 2013

(51) Int. Cl.
*G06F 17/50* (2006.01)
*G06F 9/455* (2006.01)
*G06F 11/22* (2006.01)

(52) U.S. Cl.
USPC .......................................... 716/136; 716/112

(58) Field of Classification Search
USPC .................................................. 716/112, 136
See application file for complete search history.

(56) References Cited

U.S. PATENT DOCUMENTS

| | | | |
|---|---|---|---|
| 7,484,198 B2 | 1/2009 | Lin et al. | |
| 7,542,891 B2 | 6/2009 | Lin et al. | |
| 7,543,254 B2 | 6/2009 | Xu et al. | |
| 7,600,207 B2 | 10/2009 | Moroz et al. | |
| 7,635,618 B2 | 12/2009 | Lin et al. | |
| 7,669,161 B2 | 2/2010 | Lin | |
| 7,681,164 B2 | 3/2010 | Lin et al. | |
| 7,739,095 B2 | 6/2010 | Lin et al. | |
| 7,767,515 B2 | 8/2010 | Moroz et al. | |
| 7,863,146 B2 | 1/2011 | Moroz et al. | |
| 7,895,548 B2 | 2/2011 | Lin et al. | |
| 7,897,479 B2 | 3/2011 | Lin et al. | |
| 7,908,573 B2 | 3/2011 | Lin | |
| 7,926,018 B2 | 4/2011 | Moroz et al. | |
| 7,949,985 B2 | 5/2011 | Moroz et al. | |
| 7,996,795 B2 | 8/2011 | Moroz et al. | |
| 8,035,168 B2 | 10/2011 | Moroz et al. | |
| 8,069,430 B2 | 11/2011 | Moroz et al. | |
| 8,086,990 B2 | 12/2011 | Lin et al. | |
| 8,219,961 B2 | 7/2012 | Moroz et al. | |
| 2005/0086615 A1* | 4/2005 | Anand et al. | 716/1 |
| 2008/0127005 A1 | 5/2008 | Lin et al. | |
| 2008/0228460 A1 | 9/2008 | Lin et al. | |
| 2008/0297237 A1 | 12/2008 | Moroz et al. | |
| 2008/0320428 A1 | 12/2008 | Lin | |
| 2009/0007043 A1 | 1/2009 | Lin et al. | |
| 2009/0031261 A1* | 1/2009 | Smith et al. | 716/2 |
| 2009/0064072 A1 | 3/2009 | Lin et al. | |
| 2009/0083688 A1 | 3/2009 | Moroz et al. | |
| 2009/0113368 A1 | 4/2009 | Lin et al. | |
| 2009/0217217 A1 | 8/2009 | Lin et al. | |

(Continued)

*Primary Examiner* — Suresh Memula
(74) *Attorney, Agent, or Firm* — Adams Intellex, PLC

(57) ABSTRACT

Computer-implemented techniques for modeling the mechanical behavior of integrated circuits using layout-dependent material properties are disclosed. The back end of line wiring that connects an integrated circuit to a substrate undergoes stresses and strains due to many heating and cooling cycles during a chip's packaging and lifecycle. Depending on integrated circuit design style, there may be vastly different thermal profiles across the integrated circuit. The mechanical behavior caused by the thermal cycles of the wire, vias, and insulators comprising the BEOL materials is simulated. Extraction of the integrated circuit structural information, regarding the BEOL materials, yields anisotropic information. Layout-dependent material volume fractions are computed using integrated circuit structural information. Anisotropic mechanical properties are determined based on the structural information. Mechanical responses are calculated based on the anisotropic material properties and the calculated material-volume fractions.

36 Claims, 8 Drawing Sheets

(56) References Cited

U.S. PATENT DOCUMENTS

| | | |
|---|---|---|
| 2009/0313595 A1 | 12/2009 | Moroz et al. |
| 2009/0319960 A1 | 12/2009 | Lin |
| 2010/0019317 A1 | 1/2010 | Moroz et al. |
| 2010/0187609 A1 | 7/2010 | Moroz et al. |
| 2010/0269079 A1* | 10/2010 | Banerjee et al. .......... 716/5 |
| 2010/0270597 A1 | 10/2010 | Sproch et al. |
| 2011/0078639 A1 | 3/2011 | Lin et al. |
| 2011/0219351 A1 | 9/2011 | Moroz et al. |
| 2011/0309453 A1 | 12/2011 | Moroz et al. |
| 2012/0011479 A1 | 1/2012 | Moroz et al. |
| 2012/0280354 A1 | 11/2012 | Moroz et al. |

* cited by examiner

US 8,776,005 B1

MODELING MECHANICAL BEHAVIOR WITH LAYOUT-DEPENDENT MATERIAL PROPERTIES

FIELD OF ART

This application relates generally to semiconductor design automation and more particularly to modeling mechanical behavior with layout-dependent material properties.

BACKGROUND

Integrated circuits are ubiquitous in modern electronic devices and systems. These highly complex systems are typically manufactured through exceedingly complicated, multi-step processes which include photolithographic printing, chemical processing, and handling. Such modern systems contain a variety of circuits including digital, analog, and mixed-signal components which are difficult and expensive to manufacture. Feature sizes of the components now comprising such systems are routinely smaller than the wavelength of visible light. In addition, the rapidly changing demands of the various markets which consume the chips drive ever-increasing device count, performance, feature sets, system versatility, and a variety of other system demands which impose contradictory design requirements on the design process. System designers are required to make significant tradeoffs in their designs to balance system performance, physical size, architectural complexity, power consumption, heat dissipation, fabrication complexity, and cost, to name only a few. Each design decision exercises a profound influence on the resulting system design.

A specification to which system designers design and test their electronic systems is the standard against which a system is compared. Therefore, the systems designers must ensure that their designs conform to the systems specification. The specification defines electrical performance, feature size, power consumption, heat dissipation, operating temperature range, temperature cycles, mechanical performance, and the like, and so on.

SUMMARY

Techniques, used to improve computational efficiency and evaluation accuracy, are implemented to enhance simulation results for back end of line (BEOL) metal interconnects and vias in dielectric layers. An isotropic or "smear" material representation is replaced by layout-dependent anisotropic representation based on material properties and structural information. Each interconnect and via layer that makes up the BEOL stack is evaluated individually. Anisotropic and layout dependent average material properties for each layer and region of interest within a layer or design are obtained. These properties take into account layout specific information such as layer levels, metal line directions, and local pattern densities in order to enhance simulation accuracy. Average materials properties are computed directly by extracting layout and layer geometry information from layout information file formats such as ITF and GDS. A computer-implemented method for design analysis is disclosed comprising: obtaining a design and integrated circuit structural information for the design; extracting anisotropic information from the integrated circuit structural information; computing layout dependent material volume fractions using the integrated circuit structural information; determining anisotropic mechanical properties based on the anisotropic information; and calculating mechanical responses based on the anisotropic mechanical properties and the material volume fractions.

The computing layout dependent material volume fractions may include computing a dependent material volume fraction for one layer. The one layer may include an interconnect layer, a via layer, or a region of interest. The design may include a plurality of layers. The design may be three dimensional. The structural information may be included in an interconnect technology file (ITF). The structural information may include one or more of vertical geometry information, material thickness, or layout dimensions. The structural information may include one or more of metallization thickness, metallization resistivity, dielectric thickness, dielectric permeability, metallization width, or metallization length. The layout dependent material volume fractions may be computed based on evaluation of three-dimensional structures. The material volume fractions may comprise an amount of metal included within a three-dimensional volume. The anisotropic mechanical properties may be determined using an averaging scheme. The averaging scheme may include serial averaging. The averaging scheme may include parallel averaging. The calculating of mechanical responses may be for a specified layer. The calculating mechanical responses may be for a plurality of layers. The calculating mechanical responses may be for a specified region. The method may further comprise determining critical parameters for the integrated circuit structural information. The critical parameters may include one or more of layer composition, volume, direction, or layer level. The method may further comprise determining volumes from coordinate and thickness information. The method may further comprise determining local material properties from the critical parameters and three-dimensional volumes. The design may include a semiconductor chip. The design may further include a package. The method may further comprise modeling mechanical interaction between the semiconductor chip and the package. The design may include through-silicon vias. The method may further comprise calculating mechanical responses for a plurality of interconnect layers or via layers where each layer is considered individually. The one or more of interconnect line directions, local pattern densities, or level of layers may be analyzed to determine anisotropic mechanical properties. The extracting anisotropic information may be based on information from technology files and design files. The calculating mechanical responses may be based on anisotropic material dependencies and layout dependent material properties.

In embodiments, a computer system for design analysis comprises: a memory which stores instructions; one or more processors coupled to the memory wherein the one or more processors are configured to: obtain a design and integrated circuit structural information for the design; extract anisotropic information from the integrated circuit structural information; compute layout dependent material volume fractions using the integrated circuit structural information; determine anisotropic mechanical properties based on the anisotropic information; and calculate mechanical responses based on the anisotropic mechanical properties and the material volume fractions. In some embodiments, a computer program product embodied in a non-transitory computer readable medium for design analysis comprises: code for obtaining a design and integrated circuit structural information for the design; code for extracting anisotropic information from the integrated circuit structural information; code for computing layout dependent material volume fractions using the integrated circuit structural information; code for determining anisotropic mechanical properties based on the anisotropic information; and code for calculating mechanical responses based on the anisotropic mechanical properties and the material volume fractions.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
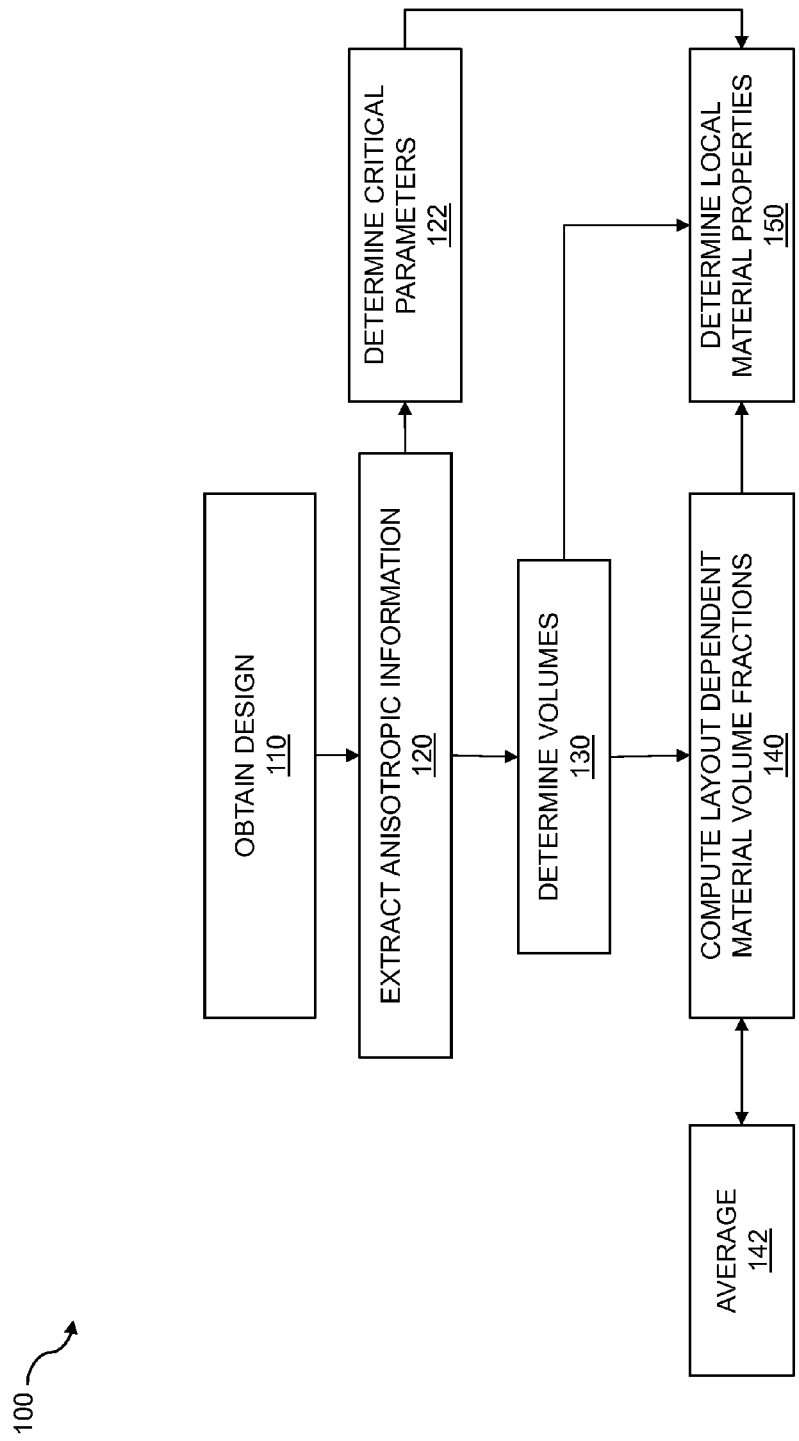
FIG. 1 is a flow diagram for design information analysis.

Modern semiconductor systems are often composed of many circuits and circuit types contained on semiconductor chips. Semiconductor chips typically have a vast number of connections where the uppermost layer of the chip is often covered with input/output (I/O) pads. The chips that make up the system are mounted into packages using solder bumps. The solder bumps form connections between the I/O pads of the chip and the corresponding connections of the package. The solder bumps are surrounded by an underfill material which provides, among other things, a better mechanical connection between the chip and the package and improves chip reliability by environmentally sealing the chip connections. To make pad connections, the chip is typically inverted and then attached to the substrate. This inversion, called "flip chip" technology, is common in the semiconductor industry. The connections within a chip typically involve numerous layers of wires, vias, and contacts surrounded by dielectric or insulator layers.

The chips making up the electronic systems operate by sourcing, sinking, and steering current to the various circuits and subcircuits that make up the chip. The many paths through the circuits and subcircuits of the chip are, among their other properties, resistive. Thus, heat results from current switching throughout the chip. This heating of the chip results even under normal operating conditions. In the case of high power chips, such heating may be extreme. Further, since some of the circuits and subcircuits of the chip are more active than others, there are regions of the chips that are relatively hotter than others. The thermal profiles of the chip, package substrate, and interconnection layers are not constant. The thermal coefficients of expansion of the chip, interconnecting layers of the BEOL, and package cause the chips and interconnecting layers to undergo stress. The mismatch between coefficients of thermal expansion also introduces residual stress during fabrication and package process steps. The metal wires, vias, and insulating underfill materials making up the layers between the chips and the substrate may be damaged, as may be the physically delicate chip.

Modeling the mechanical behavior of the connections between the solder bumps of a chip and the interconnecting layers of the BEOL involves a computationally complex and prohibitively expensive three-dimensional (3D) simulation problem. Attempts to simplify this simulation problem have traditionally included calculating the volume percent average for all of the interconnecting wires, vias, and insulating materials in the layers within a semiconductor chip to estimate an averaged volume "smear" of the materials. However, calculating the smear has proven an unreliable method of simplifying the simulation problem. For example, the smear does not take into account critical design parameters such as metal density variation from location to location, directional arrangements of metal interconnects from layer to layer, pattern characteristic changes, and metal changes from lower interconnect layers to upper interconnect layers. The computational simplicity of the smear masks critical potential design problems such as the uneven distribution of metalization or an unreliable structure with high stress.

In the disclosed concept, efficient modeling of the BEOL mechanical behavior is supported by layout-dependent anisotropic material properties. Each interconnect and via layer that makes up the BEOL layers between the chip and the substrate is considered individually. Anisotropic and layout dependent average material properties for each layer and region of interest are obtained. These properties take into account metal line directions, local pattern densities, and layer levels. Average material properties are computed directly using geometry information extracted from process geometry files such as ITF and GDS files. The local material properties are obtained using serial, parallel, or a combination of serial and parallel averaging to obtain the local material properties for any specified layers or regions of interest.

FIG. 1 is a flow diagram for design information analysis. A flow 100 for modeling mechanical behavior is described and comprises a computer-implemented method for design analysis. The flow 100 includes obtaining a design 110 and integrated circuit structural information for the design. The obtaining can include importing a design and supporting information or it can involve having the design and information already within a software tool. The obtaining can be part of an electronic design automation (EDA) process. The design may comprise various types of structural information describing critical features about the design. The structural information may include layer information including type of material, dimensions, and the like. The design may be three-dimensional, describing, for example, the connections between a chip and a substrate or package. In embodiments, the structural information is included in an interconnect technology file (ITF). The layout may be in the form of GDSII, OASIS™, or some other format for describing various shapes, sizes, and relationships of elements in a semiconductor layout.

The flow 100 includes extracting anisotropic information 120 from the integrated circuit structural information. The extracted information may include details about the structure of the layers within a chip. The structural information may include one or more of vertical geometry information, material thickness, layout dimensions and the like. The extracting of anisotropic information may be based on the information from technology files and design files. The structural information may include one or more of metallization thickness, metallization resistivity, dielectric thickness, dielectric permeability, metallization width, or metallization length. The flow 100 may further comprise determining critical parameters 122 for the integrated circuit structural information. The critical information may be based on a layer or a collection of layers—for example, interconnect layers, vias, or dielectric materials. The critical information may include a variety of parameters including one or more of layer composition, volume, direction, or layer level. The critical parameters may be determined for each layer within the BEOL layers.

The flow 100 may further comprise determining volumes 130 from coordinate and thickness information. The determined volumes will depend on the length, width, and height of a layer for a region of interest. Each layer can have a separate volume calculated as heights vary from layer to layer. The flow 100 includes computing layout dependent material volume fractions 140 using the integrated-circuit structural information and layout. Based on the determined volumes, the wiring and insulator within a layer can be analyzed to determine how much of the layer is metalization and how much is insulator. These amounts are used to compute the material volume fraction. The layout dependent material volume fractions may be computed based on evaluation of three-dimensional structures. The layout in a specific region impacts the fraction value and will vary from region to region and will also vary in different directions across a chip. Depending on the numbers of connections within a chip there may be a higher or lower concentration of wire and vias and therefore changes in the fraction values. The metalization on a chip often has a predominant direction for each layer. The direction of the metalization can impact the mechanical expansion in that direction due to the thermal coefficient for that metal.

The computation of volume factions can be done based on averaging 142. The averaging scheme may include serial averaging to obtain local material properties for any specified layers or regions of interest. When traversing a layer, the sequence of structures (i.e. metalization and insulator) can be evaluated and the average amount of the metallization present can be determined. The averaging scheme may include parallel averaging to obtain local material properties for layers or regions of interest. In some cases, a region can have a group of structures neighboring each other. When a region is traversed, the neighboring structures can be averaged in parallel to evaluate an overall average. When evaluating a vertical region with a stack, the vias and metalization can be averaged in parallel through the vertical region.

The flow 100 includes determining anisotropic mechanical material properties 150 based on the anisotropic information. The mechanical properties may be determined for local material properties based on the critical parameters and volumes as well as the volume fractions for metallization. The mechanical material properties can be determined for an individual layer as opposed to multiple layers in a smear. Once mechanical material properties are determined for multiple layers individually, the mechanical material impact of the multiple layers can be evaluated. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
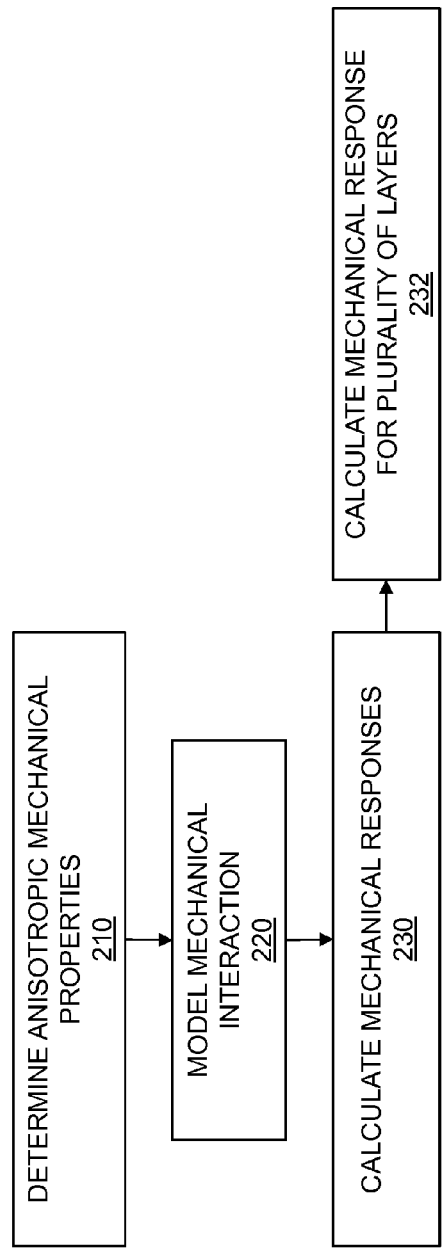
FIG. 2 is a flow diagram for calculating responses.

FIG. 2 is a flow diagram for calculating responses. A flow 200 may continue from or be part of the previous flow 100. The flow 200 includes determining anisotropic mechanical properties 210 based on the anisotropic information. Each interconnect and via layer of a BEOL stack may be evaluated individually. Anisotropic and layout dependent average material properties for each layer may be determined based on metal line direction of interconnect, pattern densities, layer levels, and the like. Local anisotropic mechanical properties may be determined. For example, anisotropic and layout-dependent average material properties for each region of interest may be determined based on the metal line direction of the interconnect, local pattern densities, layer levels, vias, and the like. A region of interest may be a stack of metalization layers and vias connecting the metallization layers. Therefore, the region could cover multiple layers with each layer being evaluated individually or the combination of layers being evaluated collectively to determine their mechanical properties.

The flow 200 may further comprise modeling the mechanical interaction 220 between a semiconductor chip and a package. A flip-chip technology may utilize solder bumps and surrounding underfill material to attach a chip to a package. The anisotropic mechanical material properties can be used to model mechanical interactions between the chip and the package on which the chip is mounted. The BEOL on-chip wiring includes multiple layers of interconnect, vias, and dielectric material. The heating of the chip due to normal operation may cause stresses and strains among the semiconductor, BEOL, and the package. A model of the mechanical interaction between a semiconductor chip and a package may comprise a 3-D model of the BEOL layers.

The flow 200 includes calculating mechanical responses 230 based on the anisotropic mechanical properties and the material volume fractions. Such calculating may evaluate 2-D and 3-D models of the layers of the BEOL materials between a chip and a package or substrate. The calculating may be based on layout-dependent material volume fractions and determined volumes. The calculating of mechanical responses 230 may be based on anisotropic material dependencies and layout dependent material properties. The calculating of mechanical responses may be for a specified region. The flow 200 may further comprise calculating mechanical responses 232 for a plurality of interconnect layers or via layers where each layer is considered individually. Various steps in the flow 200 may be changed in order, repeated, omitted, or the like without departing from the disclosed concepts. Various embodiments of the flow 200 may be included in a computer program product embodied in a non-transitory computer readable medium that includes code executable by one or more processors.

Figure 3:
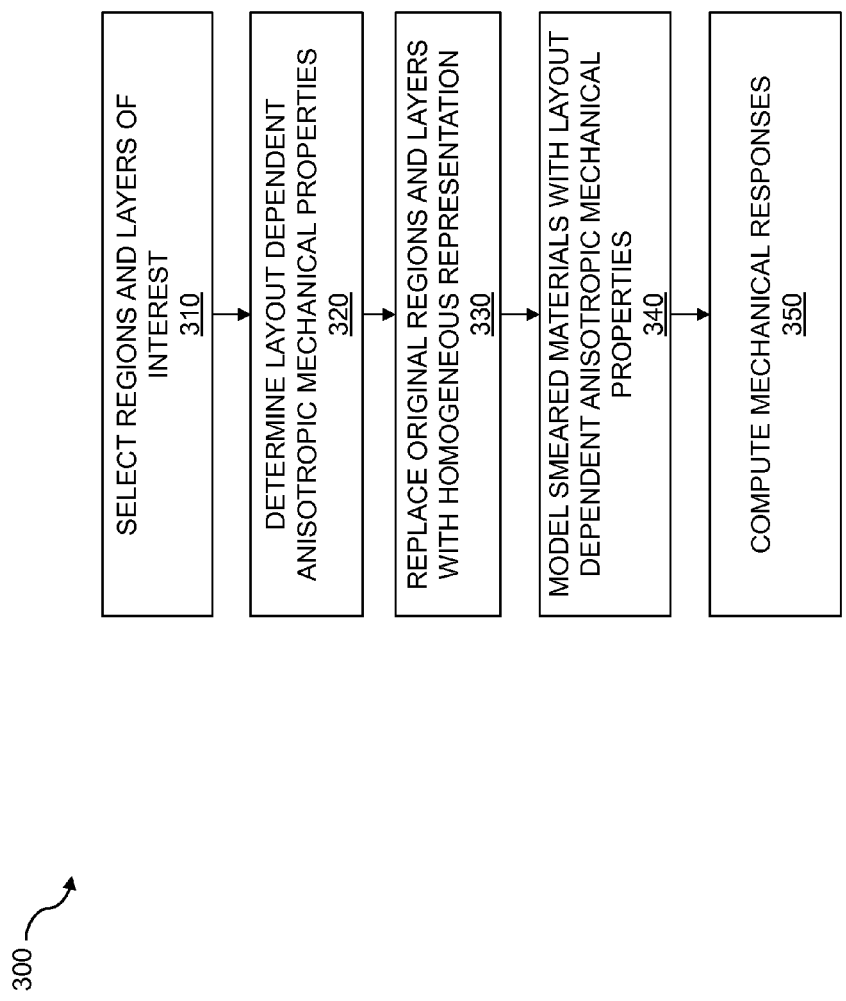
FIG. 3 is a design automation flow for modeling mechanical response.

FIG. 3 is a design automation flow for modeling mechanical response. A flow 300 may continue from or be a superset or a subset of the previous flow 100 or the previous flow 200. The flow 300 includes selecting regions and/or layers of interest 310 for modeling from a mechanical perspective. The mechanical modeling can be very useful in evaluating the impact of thermal effects in producing stress and strain within a semiconductor chip or between a chip and its package. The layers can include any of the metallization wiring or via layers as well as the insulator layers. A region can be for a portion of one layer. A region can be for a portion of multiple layers, such as through a stack of wires and vias. The flow 300 includes determining layout dependent anisotropic mechanical properties 320. For the region or layer of interest, directional mechanical properties can be determined. The directions can include those in x, y, and z directions along a chip. The flow 300 includes replacing original regions and layers with a homogeneous representation 330 or representations. By determining a volume for a layer and a fraction of that volume which includes metallization, the layer can be modeled with homogeneity rather than including all of the wires and insulators between the wires. The multiple layers can be combined so that what would have been previously modeled as a whole smeared material can now be modeled as separate homogeneous layers. The flow 300 includes modeling the smeared materials with layout dependent anisotropic mechanical properties 340. The layers can be modeled separately and each layer can have its own directional dependence for mechanical behavior. The flow 300 can include computing mechanical responses 350 using the anisotropic mechanical properties. As temperature change on a semiconductor chip, the thermal impact on the BEOL metal and insulator can be evaluated to determine the mechanical behavior based on the thermal expansion. The mechanical response can be evaluated for the x, y, and z directions. Various steps in the flow 300 may be changed in order, repeated, omitted, or the like without departing from the disclosed concepts. Various embodiments of the flow 300 may be included in a computer program product embodied in a non-transitory computer readable medium that includes code executable by one or more processors.

Figure 4:
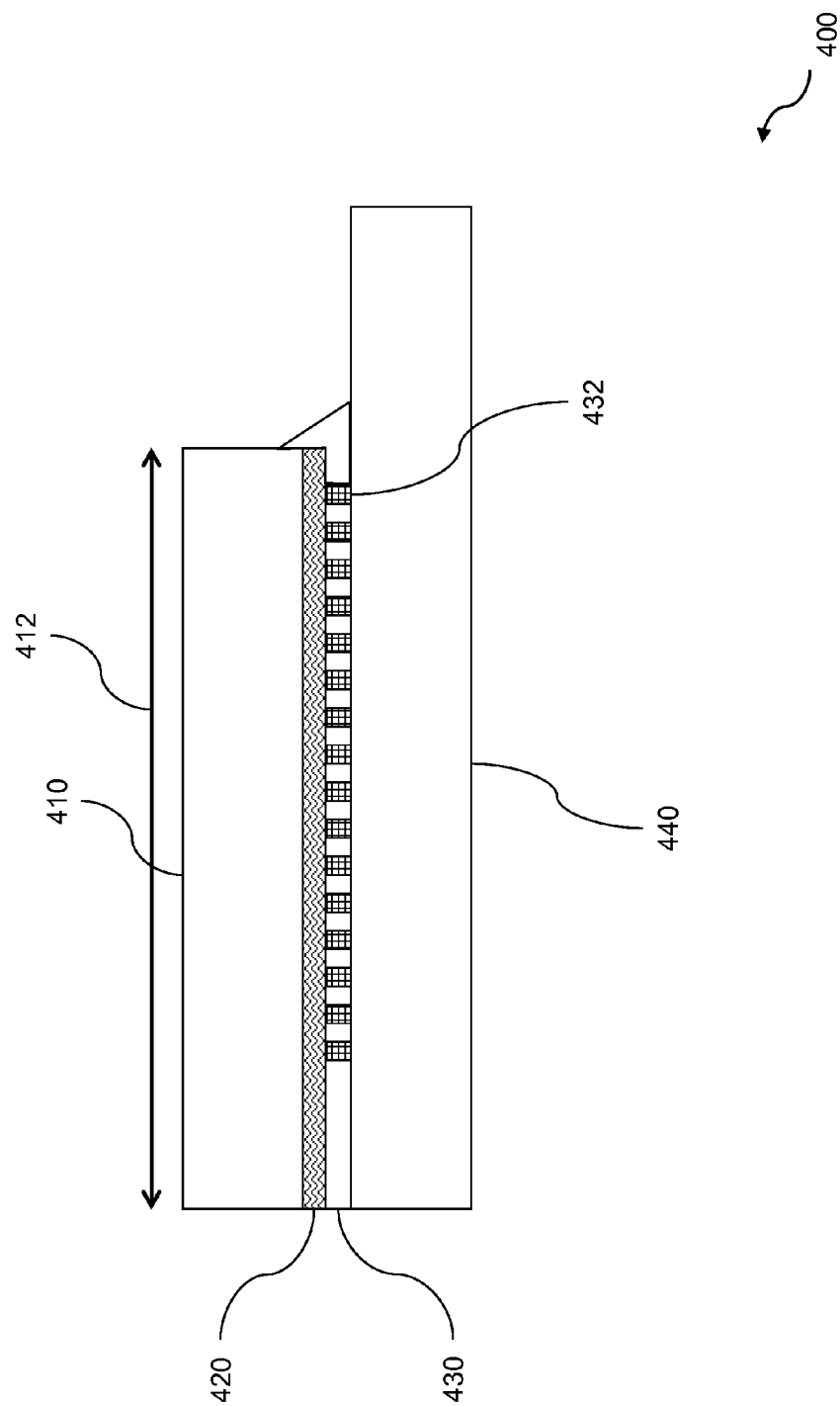
FIG. 4 is an example chip and package profile.

FIG. 4 is an example chip and package profile. The example profile 400 shows a chip 410 connected to a package 440. The chip is inverted and connected by the various layers of the BEOL structure in region 420 to an array of solder bumps 432. As the semiconductor chip 410 heats up, there can be mechanical stresses as a function of temperature. One direction's stress is illustrated by the arrow 412 where stress increases as the chip heats up further. The BEOL structure has previously been represented by a smear of the whole region. Using the disclosed concepts, the BEOL region 420 can be modeled anisotropically on a layer by layer basis. The interstitial space between the chip and the substrate which is not otherwise occupied by solder bumps can be filled with an underfill material 430. The underfill material helps to attach the chip to the substrate and to hold and protect the chip. The solder bumps are in turn connected to a package 440. The package may, in some cases, be part of a multichip module. In some cases the design may include through-silicon vias.

Figure 5:
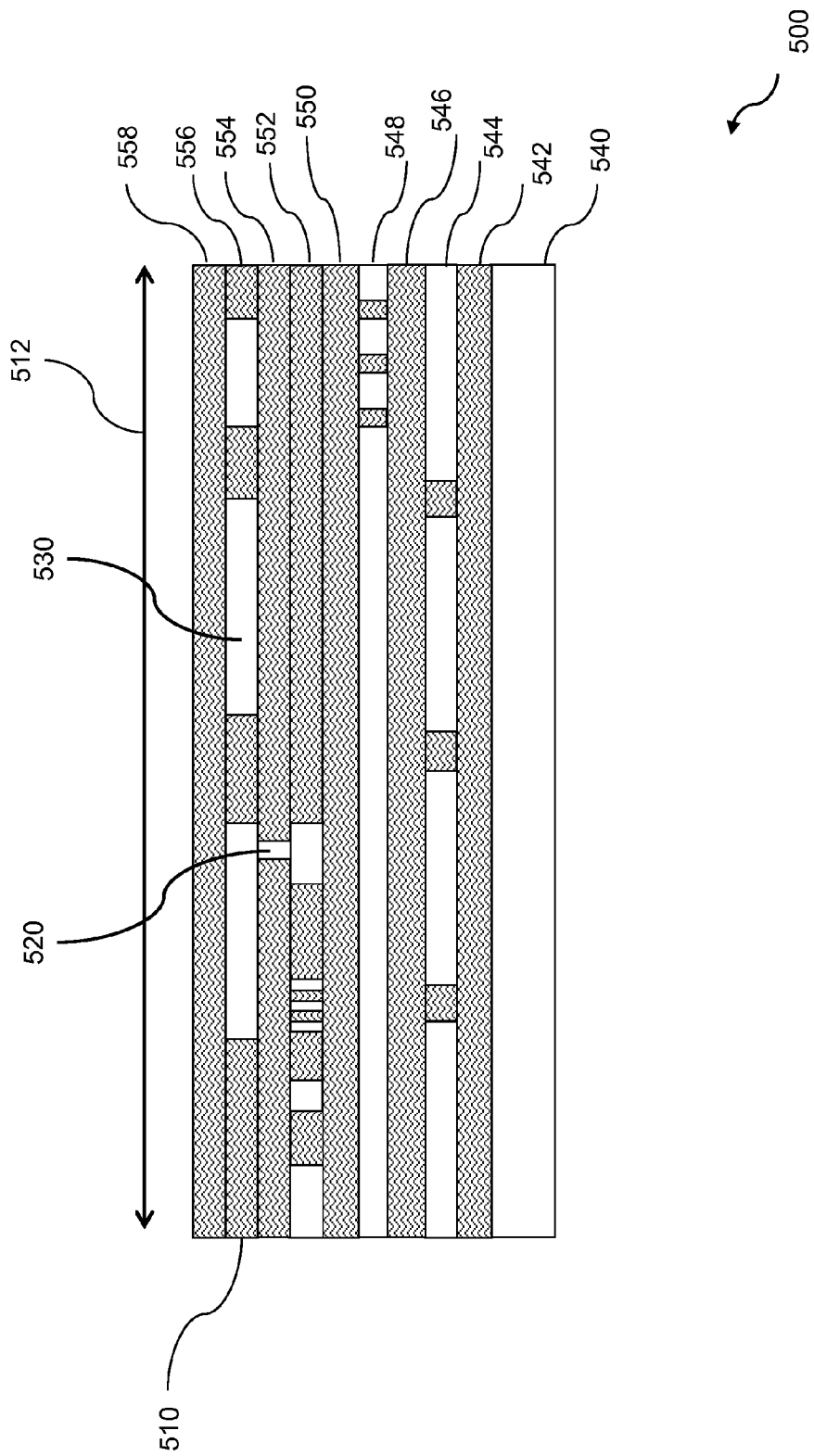
FIG. 5 is an example BEOL profile for a semiconductor ship.

FIG. 5 is an example BEOL profile 500 for a semiconductor ship. This profile 500 is a cross-section of a portion of a semiconductor BEOL region. Part of the semiconductor substrate 540 for the chip is shown. Beyond this substrate 540, a first layer 542 including insulator in this region is shown as well as a second layer 544 with a mixture of metalization and insulator. A third layer 546, in this case insulator is followed by a fourth layer 548 which is mostly metalization. A fifth layer 550 that is entirely insulator is shown followed by a sixth layer 552 and a seventh layer 554, which is mostly insulator but includes a via 520 between metalization on the sixth layer 552 and the eighth layer 556. The eighth layer 556 includes a wire 530 above which is the ninth layer 558. Above these layers can be various structures including solder bumps. The structures shown in this example should be considered illustrative and not viewed as a limitation to the disclosed concepts. Layout-dependent material volume fractions may be computed for each layer. The material volume fractions may comprise an amount of metal included within a three-dimensional volume. One stress 512 direction is shown where increases in temperature would cause an increase in stress. Anisotropic analysis can be performed on a layer by layer basis to model the mechanical response. For example, wire 530 runs in the same direction as stress 512 and as the metal expands that makes up the wire 530, the stress 512 may increase.

Figure 6:
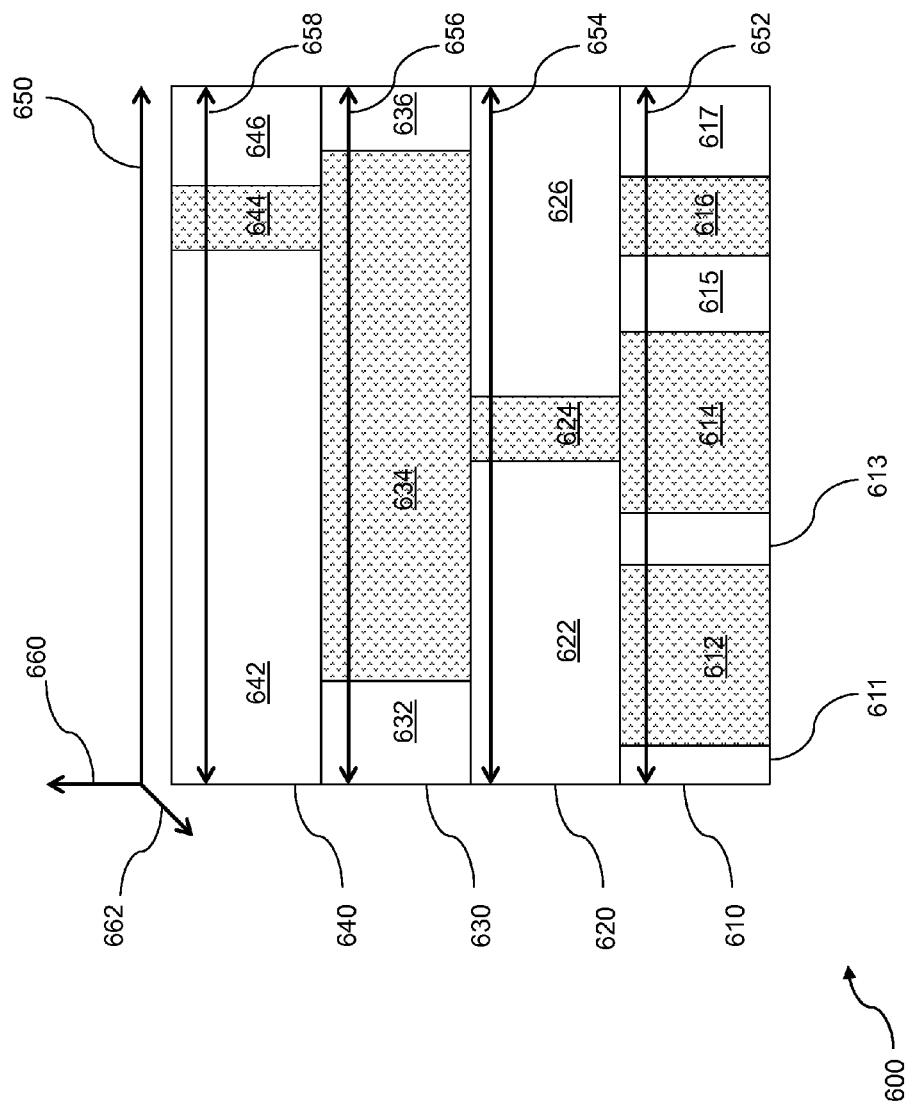
FIG. 6 shows an example region of interest.

FIG. 6 shows an example region of interest 600. Multiple layers of an example region of interest 600 are shown. The layers may include an interconnect layer 610, a via layer 620, an interconnect layer 630, and a via layer 640. The layers of the region of interest may be used to compute layout-dependent material volume fractions. For example, layer 610 may comprise a dielectric portion 611, a wire 612, a dielectric portion 613, a wire 614, a dielectric portion 615, a wire 616, and a dielectric portion 617. A layout-dependent material volume fraction may be computed for layer 610 using these structures. For layer 620, a dielectric portion 622, a via 624, and a dielectric portion 626 may be examined to determine volumes. A layout-dependent material volume fraction may be computed for layer 620 using these structures. Similarly, for layer 630, a dielectric portion 632, a wire 634, and a dielectric portion 636 may be examined to determine volumes. A layout-dependent material volume fraction may be computed for layer 630 using these structures. The layer 640 may be examined in the same manner with a dielectric portion 642, a via 644, and a dielectric portion 646 to determine volumes. A layout-dependent material volume fraction may be computed for layer 640 using these structures. The structures shown in this example region of interest 600 should be considered illustrative and not viewed as a limitation to the disclosed concepts. Based on volumes and fractions, mechanical analysis may be performed. The analysis may include calculating mechanical responses for a plurality of interconnect layers and via layers where each layer is considered individually. Other layout-dependent parameters and structural information may be considered for calculating mechanical responses based on interconnect. These parameters and information can be analyzed to determine anisotropic mechanical properties. Analysis may include determining volumes from coordinate and thickness information extracted from a design format file such as an ITF or GDSII file. Analysis may include determining local material properties from the critical parameters and three-dimensional volumes. A stress 650 direction is shown for the example profile. As the semiconductor heats up, thermal expansion can occur in the various layers based on the metalization contained within the layer. Layer 610 can have a stress 652 while layer 620 can have a stress 654. Layer 630 can have a stress 656 while layer 640 can have a stress 658. These stresses are shown in the direction of stress 650. Similarly, directional stress can be modeled for direction 660 and/or direction 662.

Figure 7:
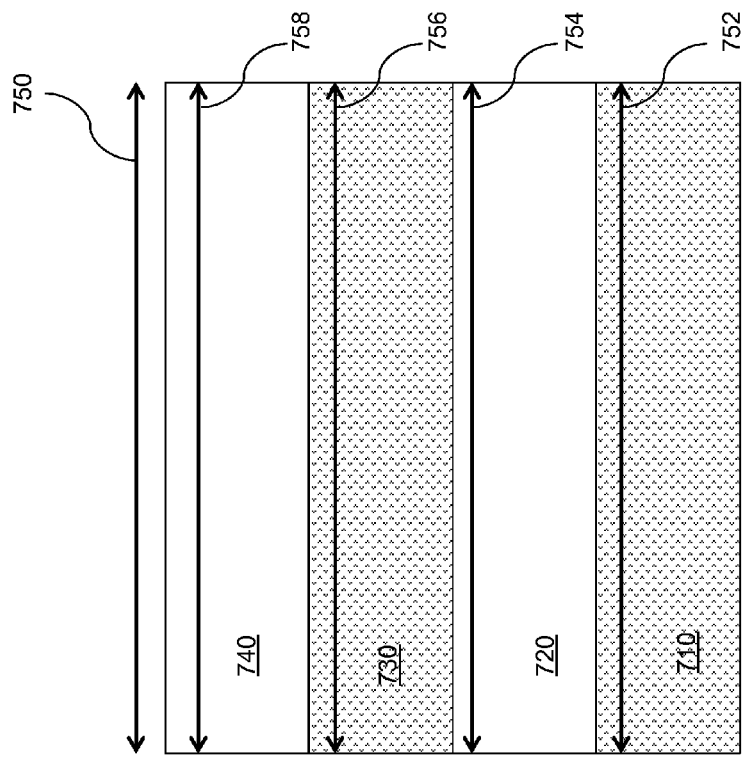
FIG. 7 is an example of layer analysis.

FIG. 7 is an example of layer analysis. A group of layers 700 is shown similar to the region of interest 600 previously shown. A first layer 710 is shown similar to the layer 610. The first layer 710 is a homogenous representation of the layer 610 where the homogeneous representation is based on the layout-dependent material volume fraction of layer 610. A second layer 720 is shown similar to the layer 620. The second layer 720 is a homogenous representation of the layer 620 where the homogeneous representation is based on the layout-dependent material volume fraction of layer 620. A third layer 730 is shown similar to the layer 630. The third layer 730 is a homogenous representation of the layer 630 where the homogeneous representation is based on the layout-dependent material volume fraction of layer 630. A fourth layer 740 is shown similar to the layer 640. The fourth layer 740 is a homogenous representation of the layer 640 where the homogeneous representation is based on the layout-dependent material volume fraction of layer 640. A stress direction 750 is shown for the semiconductor. Layer 710 can have a stress 752 while layer 720 can have a stress 754. Layer 730 can have a stress 756 while layer 740 can have a stress 758. These stresses are shown in the direction of stress 750. Similarly, other directions can be evaluated and modeled. The structures shown in this example group of layers 700 should be considered illustrative and not viewed as a limitation to the disclosed concepts. The layers may represent a BEOL arrangement and may comprise interconnect layers, via layers, and dielectric layers.

Figure 8:
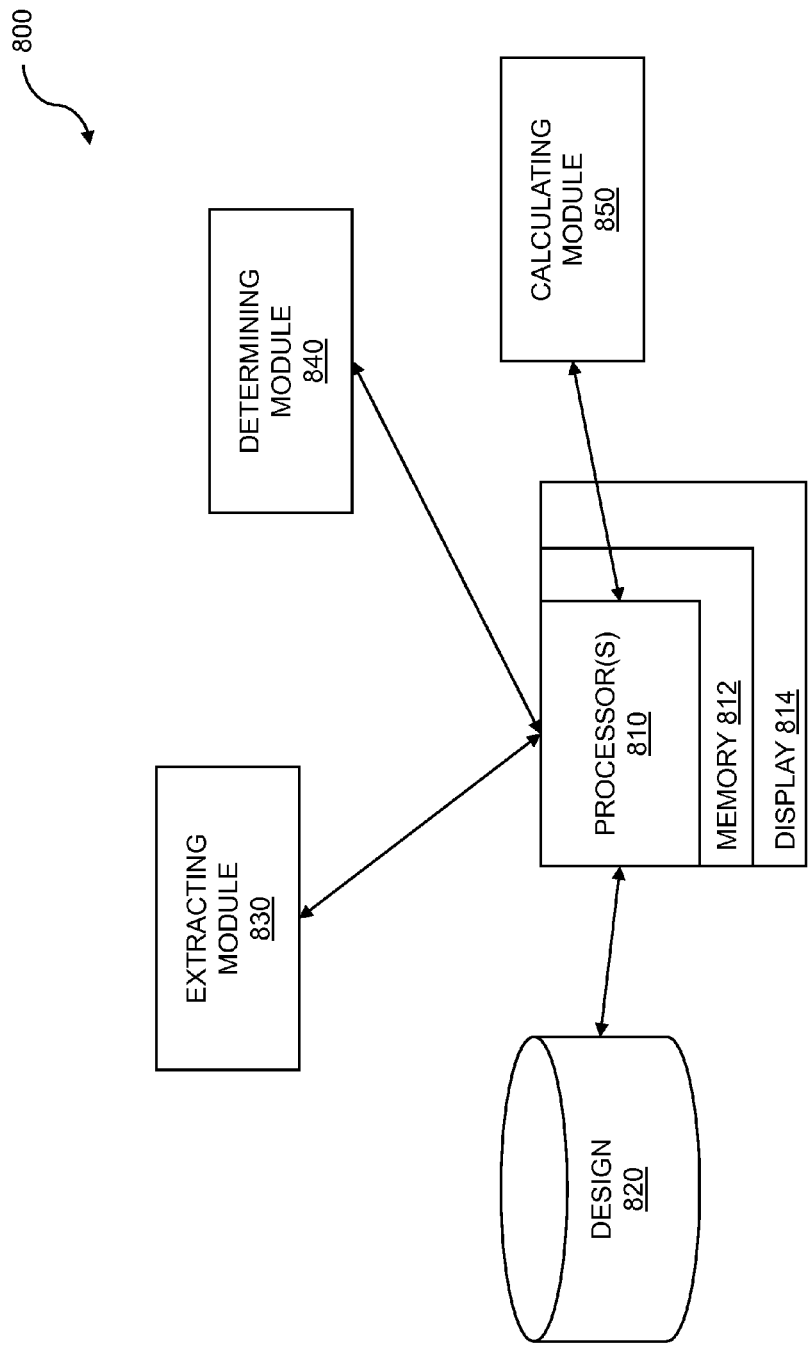
FIG. 8 is a system diagram for mechanical modeling of BEOL structures.

FIG. 8 is a system diagram for mechanical modeling of BEOL structures. A system 800 for modeling such mechanical behavior with layout-dependent properties may include one or more processors 810 coupled to a memory 812 and a display 814. The memory 812 can store code, mechanical analysis, thermal analysis, design data, instructions, system support data, intermediate data, analysis results and the like. The display 814 may be any electronic display, including but not limited to, a computer display, a laptop screen, a net-book screen, a tablet computer screen, a cell phone display, a mobile device display, a remote with a display, a television, a projector, or the like.

The processors 810 may access a design repository 820, use an extracting module 830 to extract materials properties, use a determining module 840 to determine layout-dependent material volume fractions and anisotropic mechanical properties based on anisotropic information, and use a calculating module 850 to calculate mechanical responses based on anisotropic mechanical properties and the volume fractions. In at least one embodiment, the one or more processors 810 may accomplish the functions of the extracting module 830, the determining module 840, and the calculating module 850.

The system 800 may include computer program product including code for obtaining a design and integrated circuit structural information for the design, code for extracting anisotropic information from the integrated circuit structural information, code for computing layout-dependent material volume fractions using the integrated circuit structural information, code for determining anisotropic mechanical properties based on the anisotropic information, and code for calculating mechanical responses based on the anisotropic mechanical properties and the material volume fractions, and the like.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing.

Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for design analysis comprising:
    obtaining a design and integrated circuit structural information for the design;
    extracting, using one or more processors, anisotropic information from the integrated circuit structural information;
    computing layout dependent material volume fractions using the integrated circuit structural information;
    determining anisotropic mechanical properties based on the anisotropic information; and
    calculating mechanical responses, based on interconnecting layers that undergo stress due to thermal coefficients of expansion, based on the anisotropic mechanical properties and the layout dependent material volume fractions.

2. The method of claim 1 wherein the computing layout dependent material volume fractions includes computing a dependent material volume fraction for one layer.

3. The method of claim 2 wherein the one layer includes an interconnect layer, a via layer, or a region of interest.

4. The method of claim 3 wherein the design includes a plurality of layers.

5. The method of claim 1 wherein the design is three dimensional.

6. The method of claim 1 wherein the structural information is included in an interconnect technology file (ITF).

7. The method of claim 1 wherein the structural information includes one or more of vertical geometry information, material thickness, or layout dimensions.

8. The method of claim 1 wherein the structural information includes one or more of metallization thickness, metallization resistivity, dielectric thickness, dielectric permeability, metallization width, or metallization length.

9. The method of claim 1 wherein the layout dependent material volume fractions are computed based on evaluation of three-dimensional structures.

10. The method of claim 1 wherein the layout dependent material volume fractions comprise an amount of metal included within a three-dimensional volume.

11. The method of claim 1 wherein the anisotropic mechanical properties are determined using an averaging scheme.

12. The method of claim 11 wherein the averaging scheme includes serial averaging.

13. The method of claim 11 wherein the averaging scheme includes parallel averaging.

14. The method of claim 1 wherein the calculating of mechanical responses is for a specified layer.

15. The method of claim 1 wherein the calculating mechanical responses is for a plurality of layers.

16. The method of claim 1 wherein the calculating mechanical responses is for a specified region.

17. The method of claim 1 further comprising determining critical parameters for the integrated circuit structural information.

18. The method of claim 17 wherein the critical parameters include one or more of layer composition, volume, direction, or layer level.

19. The method of claim 1 further comprising determining volumes from coordinate and thickness information in the design.

20. The method of claim 1 further comprising determining local material properties from the critical parameters and three-dimensional volumes.

21. The method of claim 1 wherein the design includes a semiconductor chip.

22. The method of claim 21 wherein the design further includes a package.

23. The method of claim 22 further comprising modeling mechanical interaction between the semiconductor chip and the package.

24. The method of claim 1 wherein the design includes through-silicon vias.

25. The method of claim 1 further comprising calculating mechanical responses for a plurality of interconnect layers or via layers in the design where each layer is considered individually.

26. The method of claim 1 wherein one or more of interconnect line directions, local pattern densities, or level of layers is analyzed to determine anisotropic mechanical properties.

27. The method of claim 1 wherein the extracting anisotropic information is based on information from technology files and design files.

28. The method of claim 1 wherein the calculating mechanical responses are based on anisotropic material dependencies and layout dependent material properties.

29. A computer system for design analysis comprising:
    a memory which stores instructions;
    one or more processors coupled to the memory wherein the one or more processors are configured to:
        obtain a design and integrated circuit structural information for the design;
        extract anisotropic information from the integrated circuit structural information;
        compute layout dependent material volume fractions using the integrated circuit structural information;
        determine anisotropic mechanical properties based on the anisotropic information; and
        calculate mechanical responses, based on interconnecting layers that undergo stress due to thermal coefficients of expansion, based on the anisotropic mechanical properties and the layout dependent material volume fractions.

30. The system of claim 29 wherein the one or more processors are further configured to determine volumes from coordinate and thickness information for the design.

31. The system of claim 29 wherein the one or more processors are further configured to model mechanical interaction between a semiconductor chip included in the design and a package.

32. The system of claim 29 wherein the one or more processors are further configured to calculate mechanical responses for a plurality of interconnect layers or via layers in the design where each layer is considered individually.

33. A computer program product embodied in a non-transitory computer readable medium for design analysis comprising:
   code for obtaining a design and integrated circuit structural information for the design;
   code for extracting anisotropic information from the integrated circuit structural information;
   code for computing layout dependent material volume fractions using the integrated circuit structural information;
   code for determining anisotropic mechanical properties based on the anisotropic information; and
   code for calculating mechanical responses, based on interconnecting layers that undergo stress due to thermal coefficients of expansion, based on the anisotropic mechanical properties and the layout dependent material volume fractions.

34. The computer program product of claim 33 further comprising code for determining volumes from coordinate and thickness information.

35. The computer program product of claim 33 further comprising code for modeling mechanical interaction between a semiconductor chip included in the design and a package.

36. The computer program product of claim 33 further comprising code for calculating mechanical responses for a plurality of interconnect layers or via layers in the design where each layer is considered individually.

* * * * *